United States Patent
Reed

(10) Patent No.: US 8,009,324 B2
(45) Date of Patent: *Aug. 30, 2011

(54) METHODS AND APPARATUSES FOR PRINTER CALIBRATION

(75) Inventor: Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/105,647

(22) Filed: Apr. 18, 2008

(65) Prior Publication Data

US 2008/0192275 A1 Aug. 14, 2008

Related U.S. Application Data

(63) Continuation of application No. 10/954,632, filed on Sep. 29, 2004, now Pat. No. 7,443,537.

(60) Provisional application No. 60/507,568, filed on Sep. 30, 2003, provisional application No. 60/514,958, filed on Oct. 27, 2003.

(51) Int. Cl.
   H04N 1/407 (2006.01)
   H04N 1/46 (2006.01)
   G03F 3/08 (2006.01)
   G06K 9/00 (2006.01)
   G03G 15/00 (2006.01)

(52) U.S. Cl. ....... 358/1.9; 358/3.01; 358/3.28; 358/504; 358/518; 358/526; 382/100; 382/162; 382/167; 347/19; 347/107; 399/72

(58) Field of Classification Search ............ 358/1.9, 358/504, 518, 526, 3.01, 3.28; 382/162, 382/167, 100; 399/72, 301, 395; 250/568, 250/462.01; 235/485; 347/107, 19
See application file for complete search history.

(56) References Cited

U.S. PATENT DOCUMENTS

| | | | |
|---|---|---|---|
| 4,449,052 A * | 5/1984 | Krieg | ............. 250/568 |
| 5,293,539 A | 3/1994 | Spence | |
| 5,471,313 A | 11/1995 | Thieret | |
| 5,510,896 A | 4/1996 | Wafler | |
| 5,598,272 A | 1/1997 | Fisch | |
| 5,625,716 A | 4/1997 | Borg | |
| 5,748,330 A | 5/1998 | Wang | |
| 5,774,639 A | 6/1998 | Schildkraut | |
| 5,838,465 A | 11/1998 | Satou et al. | |
| 6,011,906 A | 1/2000 | Muroki | |
| 6,067,406 A | 5/2000 | Van Hoof | |
| 6,198,549 B1 | 3/2001 | Decker | |
| 6,262,810 B1 | 7/2001 | Bloomer | |
| 6,411,318 B1 | 6/2002 | Sawano | |
| 6,493,083 B2 | 12/2002 | Parisi | |
| 6,714,748 B1 * | 3/2004 | Nakayasu et al. | ............. 399/72 |
| 6,736,478 B2 | 5/2004 | Franzke | |
| 6,798,536 B1 | 9/2004 | Muramoto | |
| 6,912,064 B1 | 6/2005 | Fujita | |

(Continued)

OTHER PUBLICATIONS

Final Office Action on U.S. Appl. No. 12/259,720, mailed Sep. 16, 2010.

(Continued)

Primary Examiner — Charlotte M Baker

(57) ABSTRACT

A test pattern printed by a printer is assessed—without colorimetric equipment—to provide data used in recalibrating the printer. The assessment may be made by an unskilled operator, and can include discerning whether a particular pattern is visible in the printed test pattern, or whether a feature in the test pattern is relatively wider or narrower. From such assessment, needed changes to the printer's calibration data are inferred and implemented. A variety of other printer calibration techniques are disclosed. The technology is illustrated in the context of dye sublimation printers, and is particularly useful in optimizing printing of digitally-watermarked graphics.

27 Claims, 10 Drawing Sheets

U.S. PATENT DOCUMENTS

| | | |
|---|---|---|
| 6,965,462 B1 | 11/2005 | Henderson |
| 7,023,578 B2 | 4/2006 | Hayes |
| 7,038,811 B1 | 5/2006 | Haikin |
| 7,069,164 B2 | 6/2006 | Viturro |
| 7,130,076 B2 | 10/2006 | Shibuya et al. |
| 7,154,634 B2 | 12/2006 | Hung |
| 7,224,820 B2 * | 5/2007 | Inomata et al. ............... 382/100 |
| 7,317,554 B2 * | 1/2008 | Ueda et al. .................... 358/1.9 |
| 7,375,857 B1 | 5/2008 | Pinard |
| 7,456,998 B2 | 11/2008 | Nishikawa |
| 2004/0135878 A1 | 7/2004 | Mizes et al. |

OTHER PUBLICATIONS

Non-Final Office Action on U.S. Appl. No. 10/954,632, mailed Oct. 10, 2007.

Non-Final Office Action on U.S. Appl. No. 12/259,720, mailed Feb. 4, 2011.

Non-Final Office Action on U.S. Appl. No. 12/259,720, mailed Mar. 17, 2010.

Notice of Allowance on U.S. Appl. No. 10/954,632, mailed Apr. 21, 2008.

* cited by examiner

After changing printer ribbon, print gray calibration target
Find calibration patch which is the closest match to the reference gray above.
Enter calibration patch number into print software

METHODS AND APPARATUSES FOR PRINTER CALIBRATION

RELATED APPLICATION DATA

This application is a continuation of application Ser. No. 10/954,632, filed Sep. 29, 2004, which claims priority benefit to the following two provisional applications: 60/507,568, filed Sep. 30, 2003, and 60/514,958, filed Oct. 27, 2003. Each of these patent documents is herein incorporated by reference.

FIELD OF THE INVENTION

The present invention relates to printer recalibration, and more particularly relates to methods and apparatuses for such recalibration that do not rely on calorimetric measuring equipment.

BACKGROUND AND SUMMARY OF THE INVENTION

Printers typically employ stored calibration data that maps input image signals into the device's output color space, e.g., to reduce non-linearities in the device's color response. This calibration profile is usually set at the factory, and not thereafter altered.

For many applications, such arrangements are satisfactory. However, in more demanding print environments—such as high end graphic arts work—a printer may be recalibrated periodically. Such recalibration can correct for changes in printer operation due to factors such as changes in ambient temperature, non-uniformities of consumables (e.g., inks), and differences in printing substrates.

U.S. Pat. No. 6,075,888 describes one technique for recalibrating the stored color profile of a printer. Data corresponding to a series of input test colors are provided to the printer, and are mapped to the device's output color space using the stored color profile data. Resulting color patches are printed. Colorimetric values of these patches are then measured, and the results are compared with the input test colors. Differences identified in this comparison are used to adjust the printer's stored color profile, so as to bring the calorimetric measurements of the printed output and the input test colors into better agreement.

While such a recalibration procedure may be practical in some settings, it is impractical in others. Among its disadvantages, the foregoing technique requires expensive colorimetric measuring equipment, and considerable technical expertise. Moreover, it is a prolonged procedure, ill-suited for environments in which regular recalibration may be desirable.

One setting in which the above-detailed procedure is unsuitable is in connection with printers used to produce digitally watermarked photo ID cards, such as driver's licenses. For optimal results, it is desirable to recalibrate such printers periodically (e.g., when the printer ribbon is changed), so that the print quality of the resulting ID card is uniformly excellent, and the watermark information is well concealed yet reliably readable. However, the operator of such a photo ID printing system is typically a person who is relatively unskilled in printer technology and colorimetry, and who lacks the time or equipment to engage in a prolonged procedure.

Accordingly, there is a need for a printer re-calibration procedure that can be performed quickly, without expensive equipment, and without a high level of operator expertise.

In accordance with one embodiment, an operator performs field recalibration of a printer by printing a test graphic on a sample of the target substrate, viewing the printed graphic to discern the visibility of one or more contrasting features, and indicating (e.g., using a computer user interface) whether or not such features are visible. Based on the operator's reports of visibility, it can be determined whether the correct stored calibration data has been used, and whether it has been tweaked correctly. If not, appropriate adjustments can be made.

In some embodiments, the operator prints and assesses three test graphics, respectively evidencing the printer's ability to accurately reproduce image highlights, mid-tones, and shadows. The operator's feedback is used to adjust the stored calibration data so as to better linearize the printer's response across the three ranges.

In other embodiments, the observations can be made by a sensor disposed within the printer housing.

In accordance with a more general embodiment, a printer is instructed to print a test graphic comprised of elements that differ slightly in tone value. By reference to a difference (or absence thereof) between two or more of the elements as actually printed, a corresponding change can be made to the stored printer calibration data.

In one embodiment, the difference is the presence or absence of visible contrast between two features in the printed test graphic. In another embodiment, there are two visible contrast changes in the test graphic, and the distance therebetween is used in determining a change to the stored printer data.

Another aspect of the invention is a printing system with stored profile data, and an internal sensor system by which the foregoing difference(s) in actual printed output can be assessed. Still another embodiment is a printing system that includes a user interface through which operator assessments of printer performance can be received and used in adjusting the stored profile data.

One particular embodiment employs a two-step calibration procedure:

(a) normalize the printer and bring it back to a known condition; and (b) apply dynamic range adjustment, and check if correct table is applied.

In this embodiment, the software imaging application used with the printer, or the printer driver, is caused to print a gray balance test target that includes several differently-composed (e.g., by different R, G, B values) grey patches. An operator (or a built-in electronic color sensor) makes a visual comparison to identify the patch that most closely matches the color gray on a reference guide shipped with the printer. The selected patch is identified to a software program. This program causes the printer to return to a known condition, tweaking the dynamic range adjustment table and thereafter producing correctly color calibrated images. To confirm correct calibration, a further test pattern can be printed and again visually inspected.

The foregoing and other features and advantages of the present invention will be more readily apparent from the following detailed description, which proceeds with reference to the accompanying drawings.

DETAILED DESCRIPTION

For expository convenience, the following description focuses on an exemplary application of the technology, namely calibrating a dye sublimation printer of the sort commonly used to produce photo ID documents, such as driver's licenses. Dye sublimation printers are well suited for this application due to the high quality of the printed images, and the stability of the printed substrates.

Dye sublimation—and its close relative, dye diffusion—are thermal imaging technologies that allow for the production of photographic quality images. Dye sublimation typically employs a set of panels (or ribbons) that are coated with a dye (e.g., cyan, magenta, yellow, black, clear-but-UV-responsive, etc.) that can be transferred to a receiver sheet or ID document by the application of heat (and sometimes pressure) from a stylus or thermal printhead at discrete points. The dye sublimates and migrates into the document substrate, where it is chemically bound to the substrate or, if provided, to a receptor coating. Typically, printing with successive color panels across the document creates an image in or on the document's surface.

An image can also be imparted via a so-called "mass transfer" (or thermal mass transfer) panel. Standard dye diffusion printers, such as the model TCP manufactured by Atlantek Inc., and the model Eltron P720 manufactured by Zebra Technologies, often incorporate both dye diffusion and mass transfer panels. A mass transfer panel typically includes a resin (e.g., black resin, or a resin having UV properties) that can be thermally transferred to the ID document.

Further details on such printers are provided in U.S. Pat. Nos. 5,793,403 and 6,532,032.

To simplify the following discussion, a black and white example is particularly considered. However, the same principles can likewise be employed in color embodiments, e.g., by performing such procedures for each of the component color channels.

Figure 1:
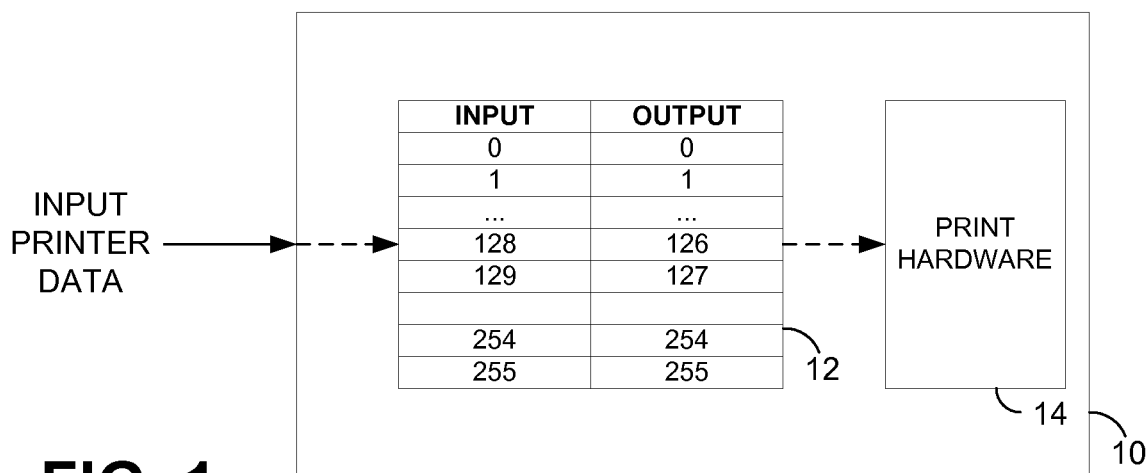
FIG. 1 is a block diagram of part of a printer, showing the use of a lookup table to map input signal values into output signals that drive the print hardware, to effect desired printer calibration.

Referring to FIG. 1, when image data is provided to a printer 10, the input pixel values (or other driving signals) are commonly applied to a lookup table 12 that maps the input values to output values needed to cause the print hardware 14 to output the desired shade (color). Thus, for example, if a middle gray of value "128" is desired, the idiosyncrasies of a particular printer design may require a driving signal of value "126" be applied in order to achieve the desired middle gray output. The lookup table 12 serves to map the input value of 128 into an output value of 126.

Figure 2:
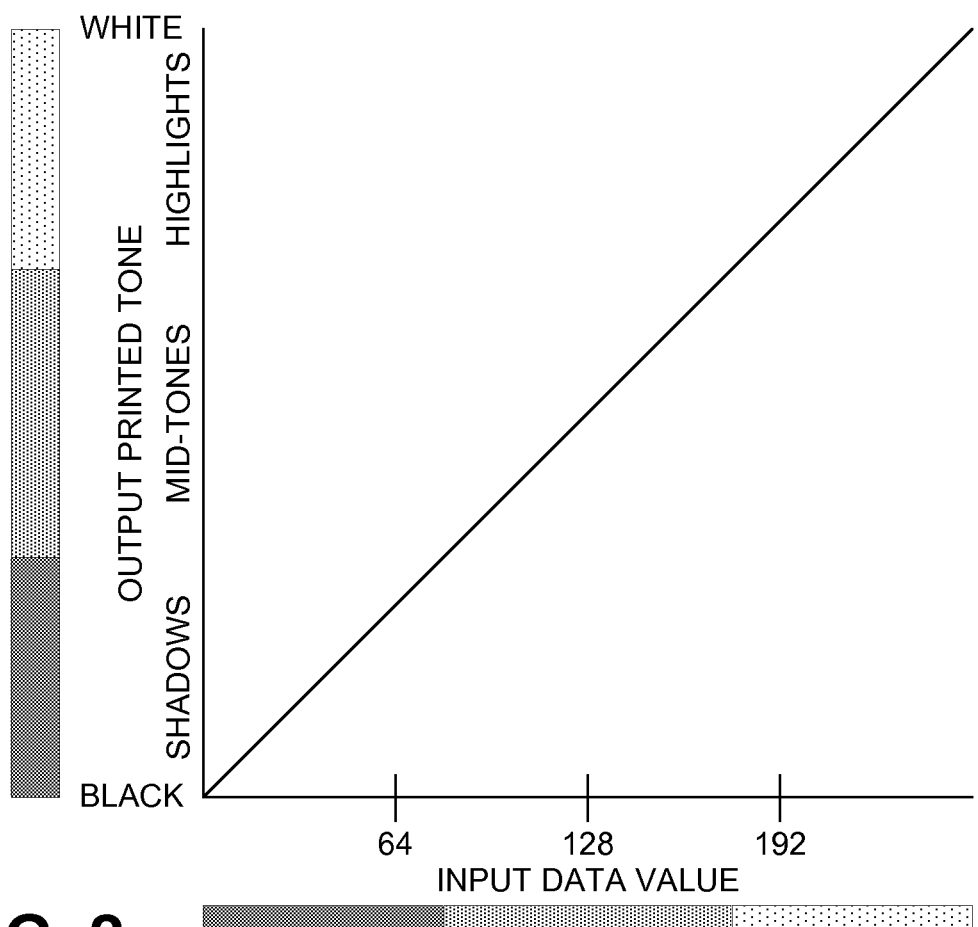
FIG. 2 is a plot showing a transfer function of an ideal printer, where each increase in input signal value results in a corresponding increase in printed output tone.

FIG. 2 shows the result when the lookup table of FIG. 1 is serving its intended purpose. This chart shows the output printed tone (along the vertical axis) as a function of the input data values applied to the printer. As indicated by the straight line, the response is linear. And the response is such that a driving value of 0 yields black, a driving value of 128 yields a middle gray, and a driving value of 255 yields white.

(The shaded blocks along both axes serve simply to identify gross ranges of the data values, i.e., shadows, mid-tones, and highlights. In actual practice, the input data values are not grouped into three sets; nor are the output tones.)

The values in the lookup table 12 are set at the factory and, usually, not thereafter changed. However, factors such as different consumables (inks, print substrates), environmental variables, etc., can cause a printer's response to deviate from the response shown in FIG. 2.

Figure 3:
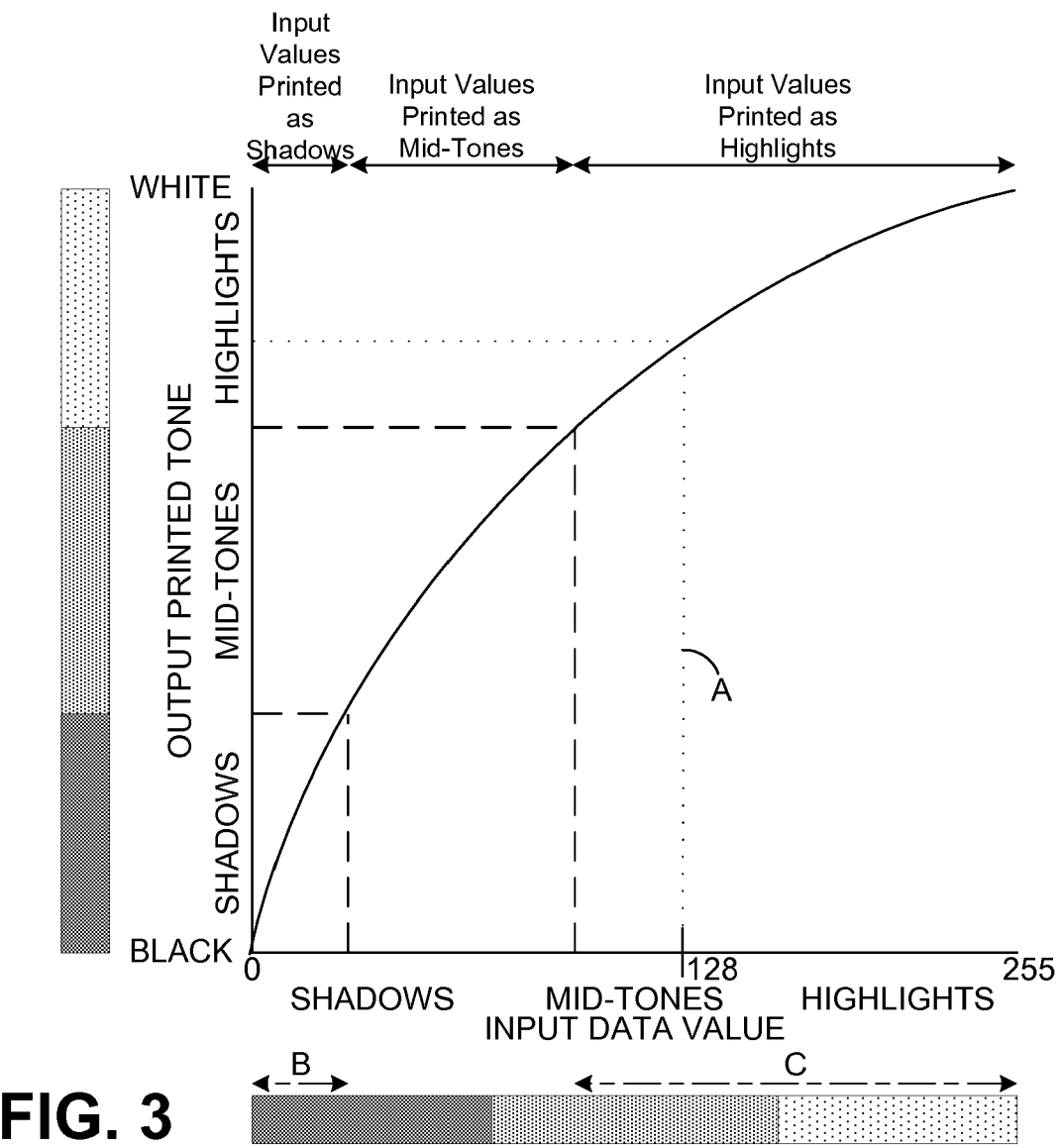
FIG. 3 is a plot showing a transfer function of a printer that is out of calibration.

FIG. 3 shows an illustrative response of a printer that, for some reason, is out of calibration. As can be seen, the response curve is not linear, but instead is bowed. An input value of 0 still results in printed black, and an input value of 255 still results in printed white. However, an input value of 128 no longer results in middle gray. Instead, as shown by dotted line "A," an input value of 128 results in a lighter tone (up in the "highlights" range).

The results of this mis-calibration are various. In one respect, it has the effect of expanding the shadows in the output image. As shown by range "B" at the bottom of FIG. 3, the input data values that result in printed tones spanning the "shadow" range are concentrated down at the lowest values of input data. Slightly higher input data values that normally would produce shadow printed tones are now expanded in rendering, producing printed mid-tones.

Likewise, this mis-calibration has the effect of compressing the highlights in the output image. As shown by range "C" in FIG. 3, some of the input data values that normally would produce printed mid-tones are here rendered as highlights instead. The input data values that normally would span the full range of highlights now result in output tones compressed at the top end of the highlight range.

Figures 4, 5:
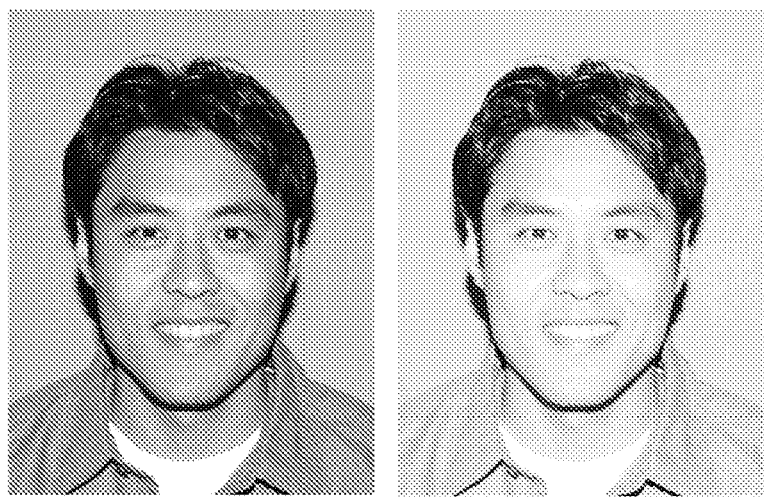
FIG. 4 shows a facial portrait produced by a properly calibrated printer, such as that whose transfer function is depicted by FIG. 2.
FIG. 5 shows a facial portrait produced by a mis-calibrated printer, such as that whose transfer function is depicted by FIG. 3.

FIGS. 4 and 5 show the result of this mis-calibration. FIG. 4 shows a facial photo as rendered on a properly calibrated printer. FIG. 5 shows the same photo as rendered on a printer having the response curve shown in FIG. 3.

As can be seen, the mis-calibrated FIG. 5 photo still has full-black and full-white portions. However, many of the mid-tones are transformed into highlights; and the intended highlights are largely washed out.

In addition to inferior aesthetics, the mis-calibrated FIG. 5 photo also suffers significantly as a carrier of steganographic (e.g., digital watermark) information. For best reliability of watermark communications, the tonal variations intended by the input image data should be faithfully reproduced in the output print.

Referring again to FIG. 3, it can be seen that a wide range of input signal values (e.g., 128-255) are rendered in a narrow range of output print tones (e.g., mid-highlights and above). This is important in watermarking because the watermark signal itself is typically of low amplitude. That is, a watermarked pixel may vary by just a few digital values from the same pixel prior to watermark encoding. If a small variation in input signal values is rendered as a further-reduced variation in output tone values, then the variation may become too small to detect, and reliability of communication suffers.

Related, in the shadow tones, a small change in input signal value is rendered as an exaggerated change in output tone. This can have the undesirable effect of magnifying the small signal introduced by the watermarking process, rendering it more visible in the printed output.

Thus, at one end of the visible range, the watermark signal may be too weak to serve its intended purpose, and at the other end of the visible range the watermark signal may be so strong as to become visibly objectionable.

Figure 6:
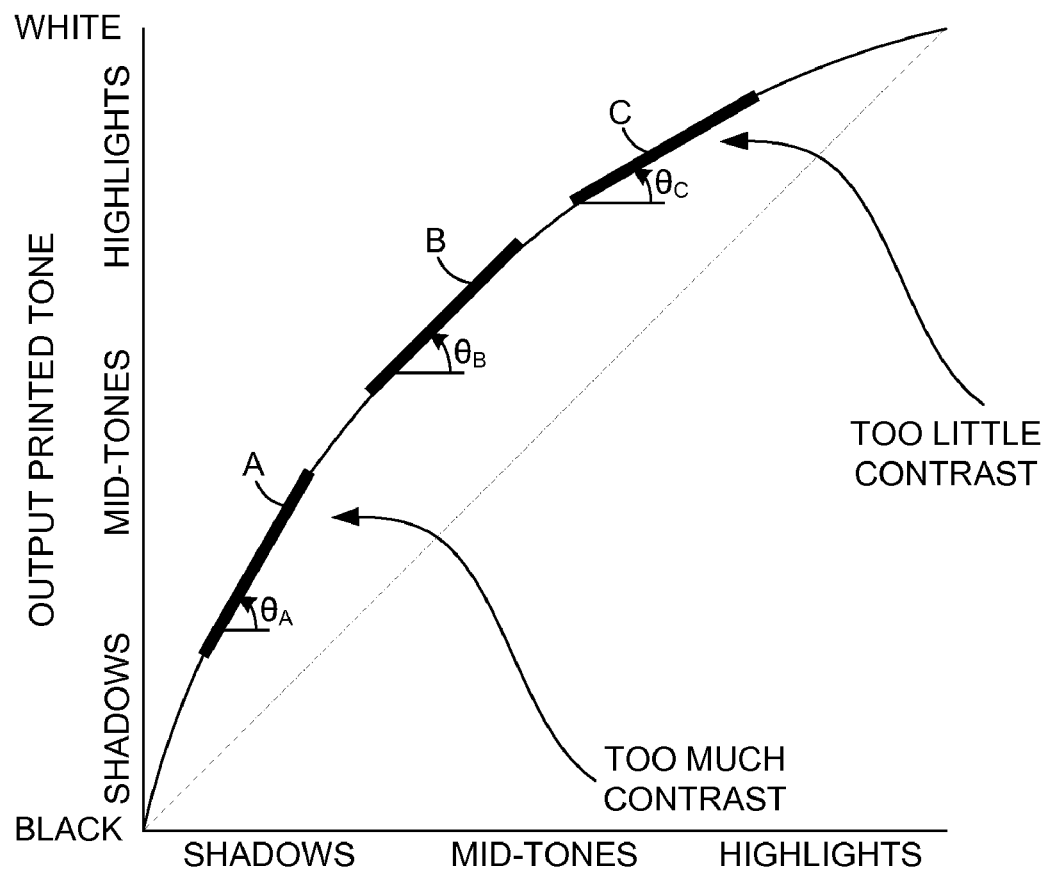
FIG. 6 is a plot like FIG. 3, but showing different features.

The problem is conceptualized in a slightly different way in FIG. 6. In this figure, the dashed line indicates the desired, linear, response between input signal values and output print tones. This line has a constant slope of 45°, indicating that every increment in input signal yields the same increment in output tone darkness. The solid line of FIG. 6, in contrast, indicates the actual, mis-calibrated printer transfer function.

As can be seen, the slope of the solid line varies over its range. For input signal values corresponding to most shadow output tones, the slope $theta_A$ of a line tangent to the transfer function curve is greater than 45°. For an input signal value somewhere between light shadows and darker mid-tones, the slope $theta_B$ is 45°. From the middle mid-tones and above, the slope $theta_C$ is less than 45°.

The slope of the curve may be regarded as contrast—the change in printed tone for a given change in input data value. At small input data values (corresponding to intended shadows), the slope is high, and the change in output tone is relatively great for a given change in input data. At middle and larger input data values (corresponding to upper mid-tones and highlights), the slope is low, and the change in output tone is relatively small for a given change in input data.

Again, watermark encoding is usually premised on a straight-line contrast function across all values of input data.

(If the transfer function distortion were known in advance, and known to be unchanging, the watermark encoding could be tailored to conform to this distortion, e.g., by reducing watermark signal added to small input signal values, and increasing the watermark signal added to large input signal values. However, such a known, unchanging transfer function is generally not the case.)

Figure 7:
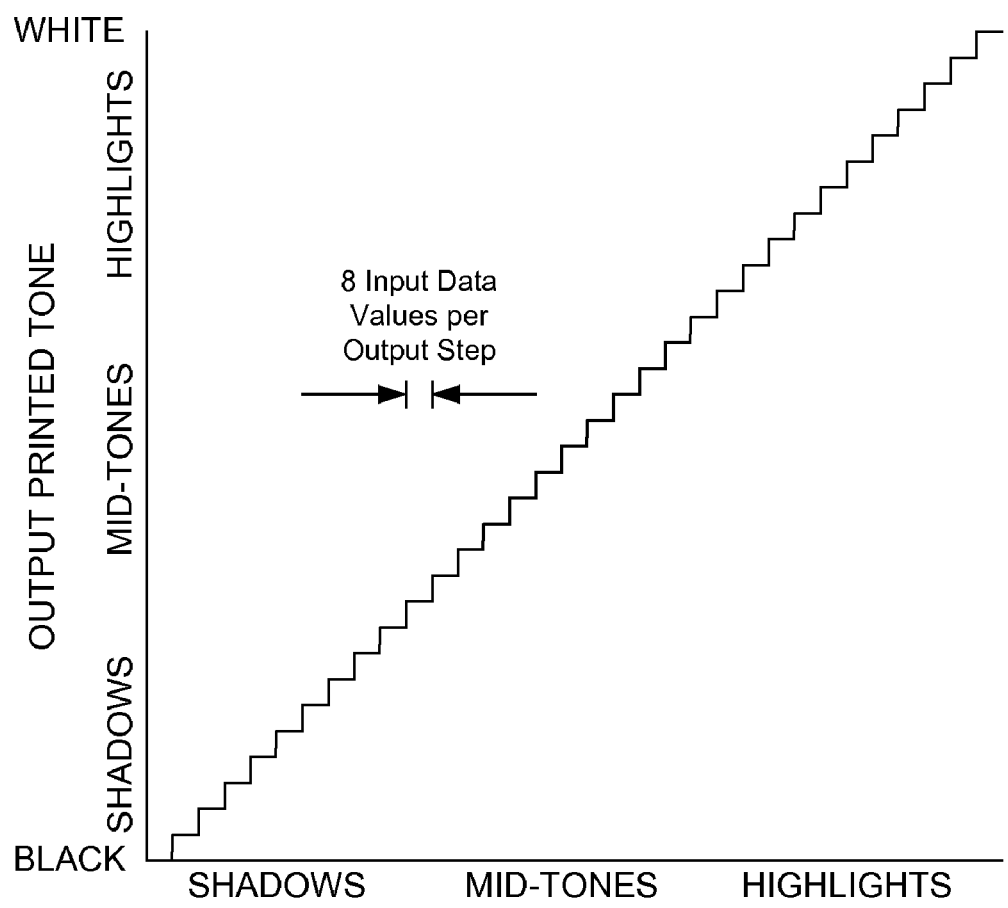
FIG. 7 is a plot showing a transfer function of an ideal printer that outputs uniform print tones over a range of input signal values.

FIG. 7 shows another complication. Many printers cannot print 256 discrete output tones. Dye sublimation printers of the sort used in printing drivers licenses, for example, can print only about 32 discrete tones. Further gradation is not generally practical due to the physics of the printing mode. (Inkjets are even worse—typically only being able to produce 4 discrete output tones, due to limited control of droplet volume.)

Most inkjet printers, and some other printers, use dithering techniques to redress this shortcoming, e.g., by alternating between two discrete output tones to simulate intermediate tones. Other printers, including many dye sublimation printers, do not.

Thus, a dye sublimation printer has a stepped transfer function, as shown in FIG. 7. For input signal values of 0-7, the printer responds with a full-black output tone. For input signal values of 8-15, the printer responds with its next-to-black output tone. In like fashion, there are eight different input signal values for each stepped printed output tone. The input signal must cross one of these occasional threshold values before the output printed tone changes.

Figure 9:
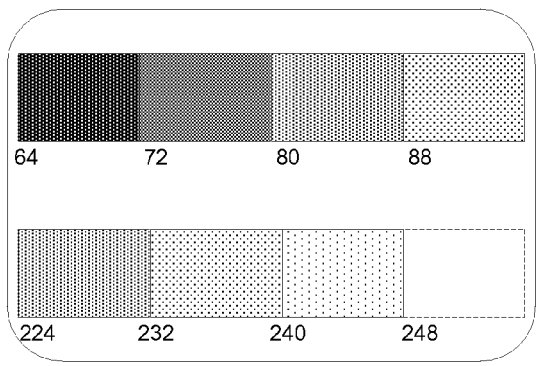
FIG. 9 shows a test card printed on a properly calibrated printer, like that shown in FIG. 7.

Printed output from such a printer thus bands close input signal values together into a uniformly-toned output, as shown by FIG. 9.

FIG. 9 is a test card printed with two stripes. The upper stripe is printed by uniformly varying the input signal value from 64 to 95. Instead of 32 printed output tones, the stripe consists of just 4 banded tones: one output for input signal values of 64-71; another for input signal values of 72-79; another for 80-87; and the last for 88-95.

The lower strip in FIG. 9 is printed by uniformly varying the input signal value from 224 to 255. Again, the same effect is manifested.

(It will be recognized that the tones actually printed in FIG. 9 are not accurate, but are selected from a limited palette of shading patterns available in the drafting tool used. The printed tones for the upper stripe should be much darker (shadows) than the tones for the lower stripe (highlights). And the printed tone for the range 248-255 is white; the dashed border around the area in the lower right of FIG. 9 would not actually appear.)

The transfer function of FIG. 7 (and the card of FIG. 9) correspond to the ideal case, in which the printer's transfer function between input driving signal, and output printed tone is linear (albeit stepped). The transfer function of FIG. 8 shows the case in which the non-linearity earlier discussed is present.

Figure 8:
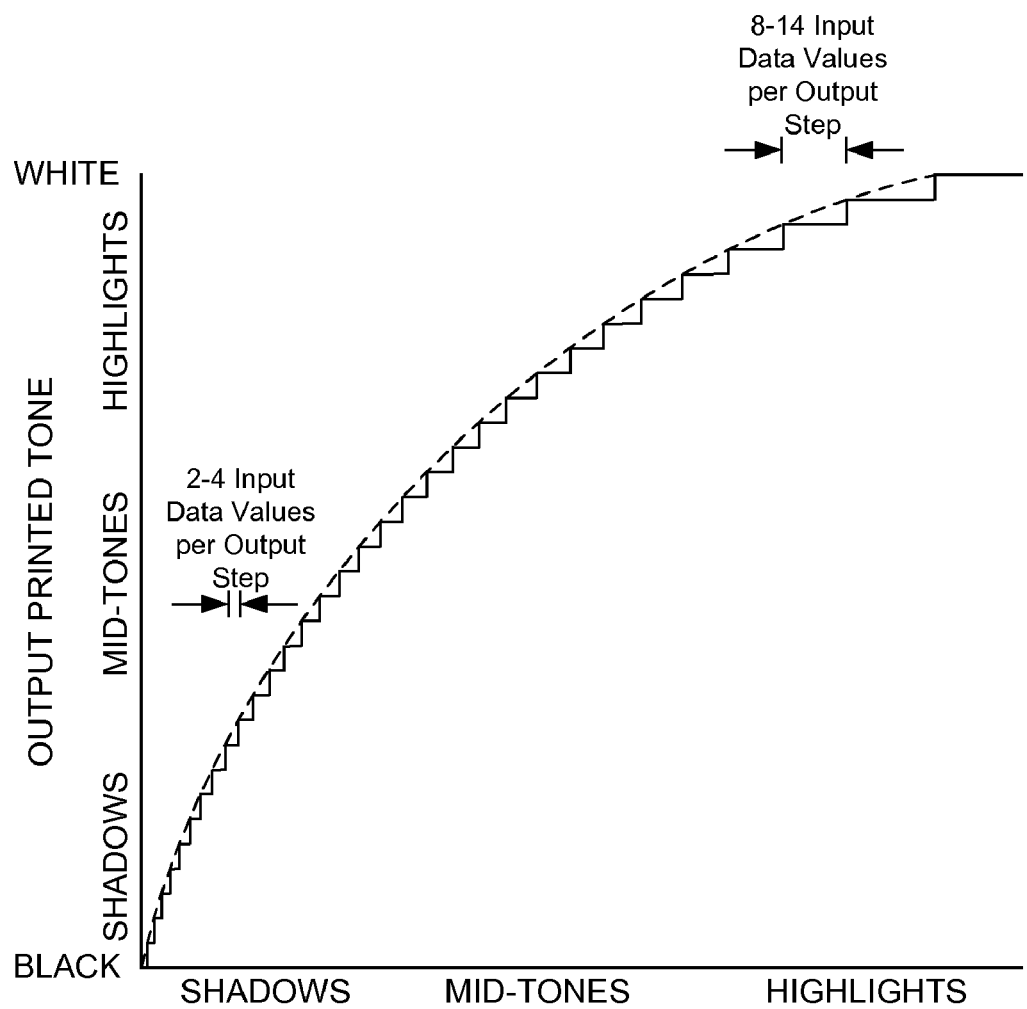
FIG. 8 is a plot like that of FIG. 7, but showing a printer exhibiting a non-linearity like that depicted in FIGS. 3 and 6.

In FIG. 8, the dashed curve is the transfer function of FIGS. 3 and 6. The solid line is the stepped transfer function of the actual printer. Unlike the ideal case of FIG. 7, the number of input signal values for each discrete output printed tone is not constant. At low signal values, the number of input signal values per step is small, e.g., 2-4. At large signal values, the number of input signal values per step is large, e.g., 8-14.

Thus, in the printer whose transfer function is illustrated, input values of 0 and 1 result in an output printed tone of full black (as opposed to input signal values of 0-7 in FIG. 7); input values of 2 and 3 result in an output printed tone of next-to-full black (as opposed to input signal values of 8-15 in FIG. 7). At the other end of the spectrum, input signal values of 242-255 may result in an output printed tone of full white (as opposed to input signal values of 248-255 in FIG. 7).

Figure 10:
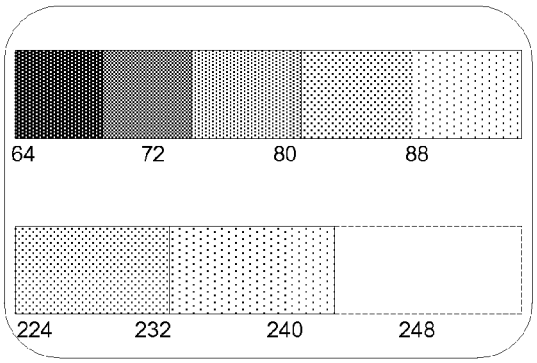
FIG. 10 shows a test card printed on a printer having a transfer characteristic like that shown in FIG. 8.

FIG. 10 shows the same test pattern as printed on the card of FIG. 9, but using a printer having the FIG. 8 transfer function. As can be seen, the upper stripe of FIG. 10 here spans five discrete output tones, instead of the four of FIG. 9. That is, instead of eight adjoining input signal values producing the same printed output tone, about six adjoining input signal values produce the same printed output tone. The widths of the printed bands are correspondingly reduced.

The lower stripe in FIG. 10 shows the complementary effect for high input signal values. The lower stripe spans three discrete output tones, instead of the four of FIG. 9. Instead of eight adjoining input signal values producing the same printed output tone, about 12-14 adjoining input signal values produce the same output tone. The widths of the printed bands are correspondingly increased.

(It will be recognized that the edges of the upper stripe in FIG. 10, and the left edge of the lower stripe, may not be at tonal transition points. That is, the same printed tone may continue for input signal values beyond the range printed in these stripes, i.e. "off-the-card.")

According to one aspect of the invention, information about the distortion of a printer's transfer function can be inferred by the width of one or more printed bands on a card like that of FIG. 10.

The width assessment can be absolute or relative. In an absolute example, the width of a band in FIG. 10 can be measured (e.g., by a ruler). The middle band in the upper stripe, for example, may be measured to have a width of about 16 mm. The middle band in the lower stripe may be measured to have a width of about 24 mm. (In a correctly calibrated printer, i.e., which produced the card of FIG. 9, all bands may have a width of 20 mm.)

In a relative width assessment, a check can be made whether the bands in the top stripe are wider, or narrower, than the bands in the lower stripe.

These assessments (which can be made manually by an operator, or by an automated arrangement), can be used to infer the shape of the transfer function curve.

Figure 13:
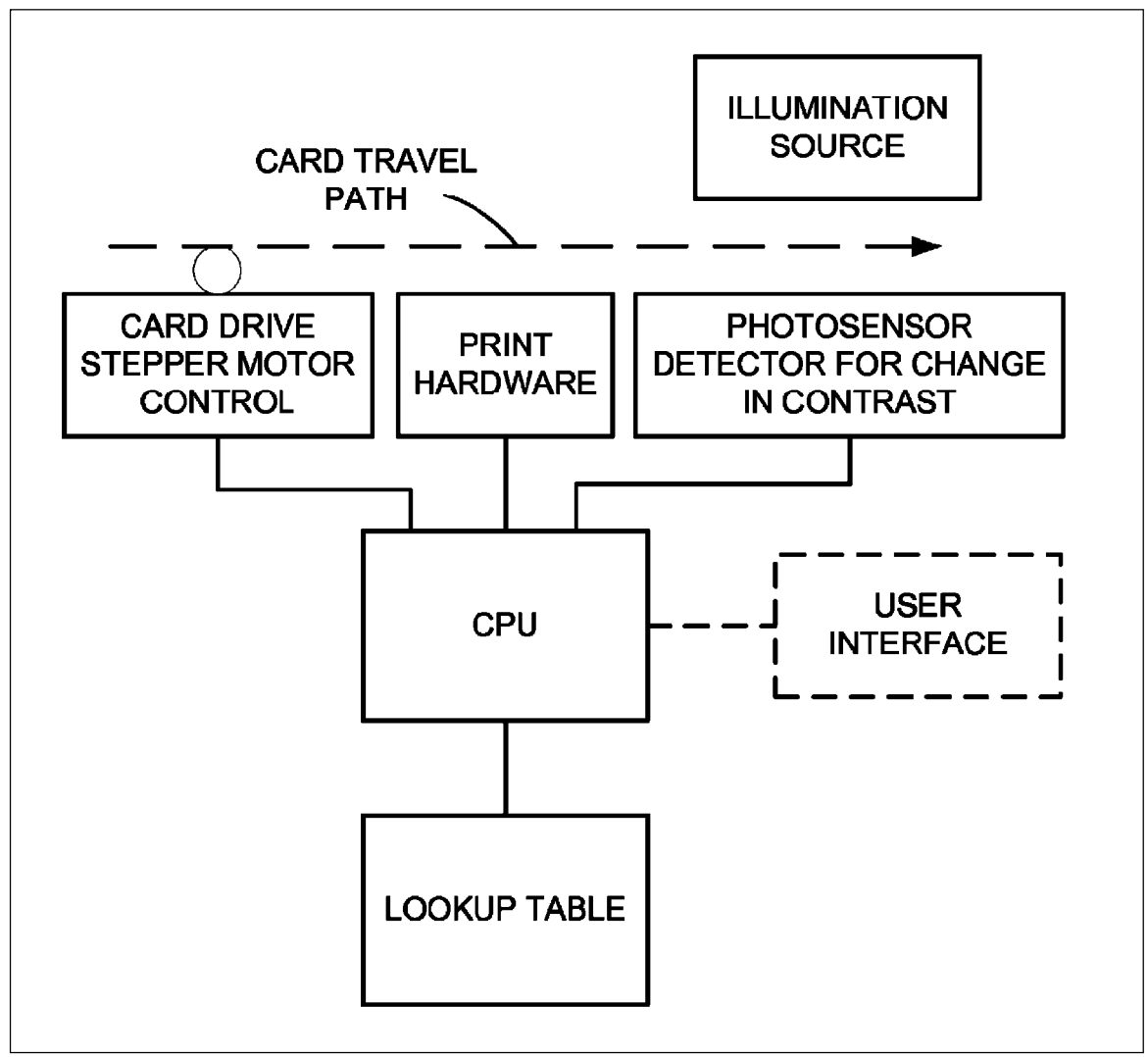
FIG. 13 is a block diagram of a printer according to one embodiment of the present invention.

One exemplary automated arrangement is shown in FIG. 13, and includes an illumination source and a photosensor to detect changes in contrast in printed cards (e.g., the contrast change between adjoining bands on the test cards of FIGS. 9 and 10). A stepper motor moves the card past the print station in controlled steps. This position data is known to the CPU, which uses the known positions at sensed contrast changes to determine the width of each printed bands. FIG. 13 also shows a user interface by which operator assessments of the printed test card(s) can be entered. (It will be recognized that an arrangement like that depicted in FIG. 13 can be included in any prior art printer—equipping it to practice methods according to the present invention.)

Figure 14:
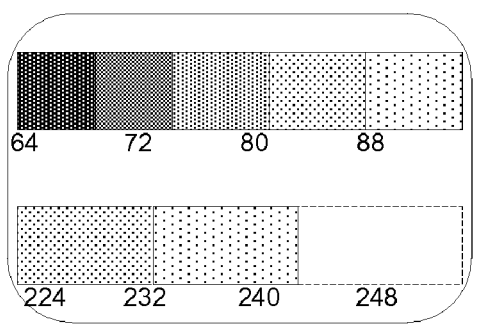
FIGS. 14-17 show how different printer transfer response curves can be inferred from different printed test card patterns.

Referring to FIG. 14, if the bands in the top stripe are narrower than expected, and the bands in the lower stripe are broader than expected, then the transfer function can be inferred to have the general shape shown on the right side of that figure.

Figure 15:
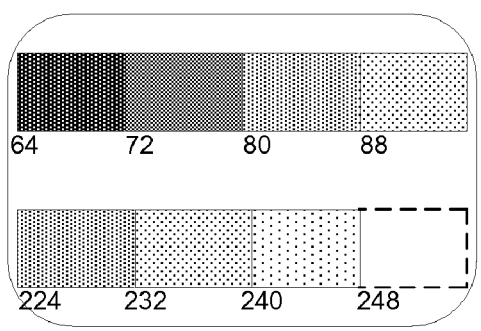

Referring to FIG. 15, if the bands in the both stripes have equal widths, then the transfer function can be inferred to be linear, as shown on the right side of that figure.

Figure 16:
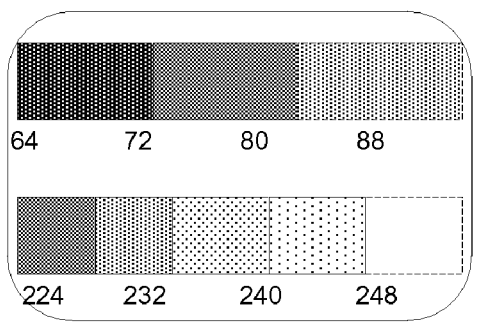

Referring to FIG. 16, if the bands in the top stripe are broader than those in the lower strip, then the transfer function can be inferred to have the general shape shown on the right side of that figure.

Generally speaking, narrow bands indicate too much contrast, i.e., too much slope in the corresponding part of the transfer function curve (and a corresponding excess in the angle theta). Conversely, broad bands indicate too little contrast, i.e., too little slope in the corresponding part of the transfer function (and a corresponding shortage in the angle theta).

Figure 17:
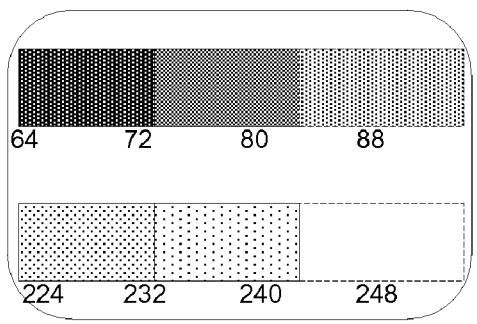

Usually, too-narrow bands at one end of the input signal range are accompanied by excessively broad bands at the other end of the range. However, this need not always be the case. FIG. 17 shows an example, in which the bands are too broad at both ends of the spectrum. In this case, the transfer function in the middle range of input signal values is steep, with a large angle θ.

It will be recognized that the test cards shown in FIGS. 14-17 are somewhat incomplete, in that they don't provide printed output except in the range of input signal values 64-94 and 224-255. However, in other embodiments, broader ranges of input signal values can be tested, e.g., by using more printed test stripes. Or one or more stripes can be printed spanning a larger range of input signal values (e.g., in the limiting case, spanning 0-255). Multiple cards may be used, or all the stripes can be printed on a single card.

One alternative test card includes three stripes—one centered around the mid-point of the shadow range (e.g., centered around an input signal value of about 42), one centered around the mid-point of the mid-tone range (e.g., centered at about 128), and one centered around the mid-point of the highlights range (e.g., centered at about 214). Each range could extend to meet the adjoining range (e.g., each spanning about 85 digital numbers). Or the range could be shorter or longer.

Desirably, the range is not so short that an edge of a band of interest (i.e., the border at which the contrast changes with steps in the output tone) is "off-the-card." For example, if broad bands—each corresponding to up to 14 different input signal values—are anticipated, then a range of 25 input signal values may be too small. One band may be partially off the left edge of the card, and have 12 values "on the card." The adjoining band may start with 13 values "on the card" and terminate with another value off the right edge of the card. Neither band is measurable, since each ends off the card.

In preferred embodiments, each stripe spans a number of input signal values at least equal to 2N+1, where N is the broadest band anticipated (measured in range of corresponding input signal values).

Once the shape of the transfer function has been inferred (which may be by the foregoing procedure, or otherwise), then the calibration data stored in the printer can be changed accordingly.

In one embodiment, the printer has an interface through which data characterizing the shape of the transfer function is received. If the assessments are made by a human operator, this interface can be a graphical user interface, such as a display on a screen with which the user interacts by means such as typing, touching, or mouse clicking, etc. If the assessments are made by one or more sensors within the printer, the interface can be an electrical or data interface.

The adjustments to the stored calibration data can be effected in various ways. One is by adding (or subtracting) small values (e.g., 1 to 10) to the calibration data already stored (e.g., in lookup table 12 of FIG. 1). Another is by multiplying the existing calibration data values by corresponding scale values (i.e., values close to 1, such as 0.85 to 1.15). Still another is by maintaining the original calibration data, and effecting the changes in another lookup table that is serially interposed before or after the table in which the original calibration data is stored. The input data can thus be pre-compensated before application to the table 12 of FIG. 1, or the output data from table 12 can be post-compensated through such a table. (In all these cases, iterative adjustment and re-testing can be employed.)

The adjustments can be tailored to precisely correspond to the assessed print characteristics, or rote adjustments can be employed.

In the latter case, the shape of the actual transfer function may be first identified as either of the form shown in FIG. 14 (i.e., the bands in the upper stripe are narrower than those in the lower stripe), or of the form shown in FIG. 16 (i.e., the bands in the upper stripe are broader than those in the lower strip). If the test card indicates a situation like that shown in FIG. 14, the lookup table values should generally be decreased—with the largest decrease at the middle of the range, tapering to nil change at either end. This is shown in the following tables, with the original values in parentheses and replaced with adjusted values:

TABLE I

| Input Value | Output Value |
|---|---|
| 32 | (32) 30 |
| 64 | (64) 61 |
| 96 | (96) 92 |
| 128 | (128) 123 |
| 160 | (160) 156 |
| 192 | (192) 189 |
| 224 | (224) 222 |

Conversely, if the actual curve is found to be of the general shape shown in FIG. 16 (i.e., the bands in the upper stripe are broader than the bands in the lower stripe), the lookup table values should generally be increased—with the largest increase at the middle of the range, tapering to nil change at either end. This is shown in the following pair of lookup tables, with Table III being the lookup table prior to adjustment, and Table IV being the table after adjustment.

TABLE II

| Input Value | Output Value |
|---|---|
| 32 | (32) 34 |
| 64 | (64) 67 |
| 96 | (96) 100 |
| 128 | (128) 133 |
| 160 | (160) 164 |
| 192 | (192) 195 |
| 224 | (224) 226 |

Figure 18:
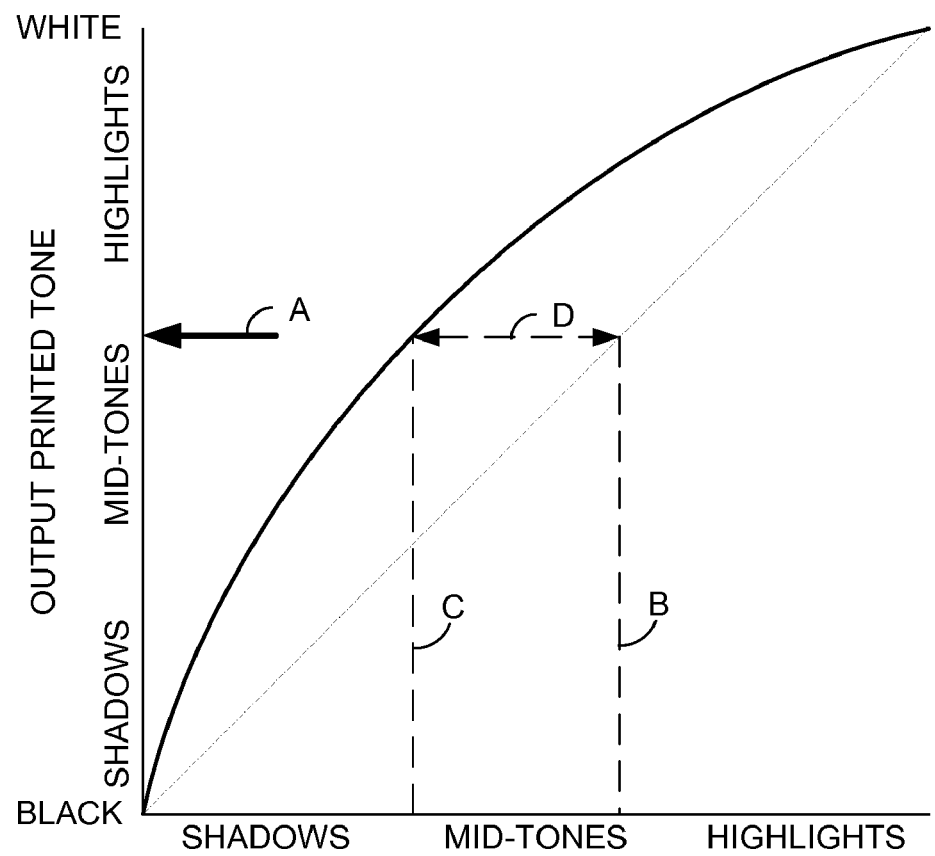
FIG. 18 shows how adjustments in the calibration table vary with input signal value.

These changes may more readily be understood by reference to FIG. 18 (which corresponds to the FIG. 14 form of distortion). It will be noted that the largest discrepancy between the idealized straight-line transfer function and the actual transfer function is in the range of middle input signal values, with the difference tapering to zero at the ends. If the desired output tone is indicated by the arrow A, this output would ideally be produced by an input signal value B. However, due to the non-linearity of the printer, it is actually an input signal value C that produces this desired output tone A. To linearize the curve, the lookup table output value formerly found for input value C should be substituted at input value B, i.e., a reduction in the amount shown by the arrow D.

The rote adjustment noted above, based on inferred transfer function curve shape, can be applied and another test card then run using the adjusted printer. If the second test card still has the appearance of FIG. 14 (i.e., with the upper bands being narrower than the lower bands) then the same adjustment can be applied again. This procedure can be repeated until the band widths in the upper and lower test stripes are approximately equal.

In another arrangement, a compensation particularly tailored to the observed test results can be applied. For example, referring to FIG. 14, it will be recognized that the absolute width of the band for an input signal value of 72 is related to the slope of the printer's transfer function at this value. By measuring the widths of the bands around different input signal values, a relatively precise inference of the required adjustments to the lookup table data can be made. (To accurately adjust the lookup table, it is best to print test strips encompassing the full range of input signal values so that the printer operation is characterized over its full range of operation.)

If the printer interface is provided with data indicating the measured width of each of the bands for input signal values ranging from 0 to 255, the lookup table data can be precisely corrected. Thus, if the first band (i.e., input signal values of 0-7) has a width of 10 mm., and is expected to ideally have a width of 20 mm., then it can be seen that the slope of the transfer function is twice the correct value (i.e., the width of the band is directly related to slope of the transfer function). To compensate for this, adjustments per the following table may be applied (again, these adjustments can be made by subtracting from the values earlier in the table, or by multiplying the original table values by scaling factors, or by pre- or post-compensation tables, etc.):

TABLE III

| Input Value | Output Value |
|---|---|
| 0 | 0 |
| 1 | (1) 0 |
| 2 | (2) 1 |
| 3 | (3) 2 |
| 4 | (4) 2 |
| 5 | (5) 3 |
| 6 | (6) 3 |
| 7 | (7) 4 |
| ... | ... |

The same assessment, and correction, can be performed for each successive band of input signal values.

Another type of adjustment is somewhat more than rote, but somewhat less than fully precise. This type of adjustment is based on the number of bands appearing in the top and bottom test stripes. In FIG. 14, the numbers are 5/3. In FIG. 15 it is 4/4. In FIG. 16 it is 3/5. In FIG. 17 it is 3/3. Each of these pairs of numbers can invoke an associated adjustment in the compensation table. The more bands in each stripe, the steeper the actual transfer function curve in the corresponding portion of the input signal range. Conversely, the fewer bands in each stripe, the more gradual the actual transfer function curve. Knowing the relative steepness of the curve in different regions, correspondingly different adjustments can be applied to the printer calibration data.

Figure 11:
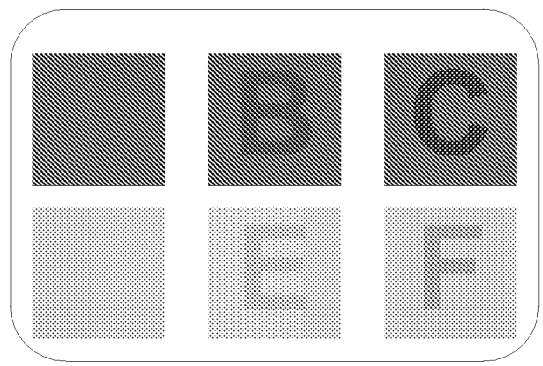
FIG. 11 shows a different test card printed on a properly calibrated printer, like that shown in FIG. 7.
Figure 12:
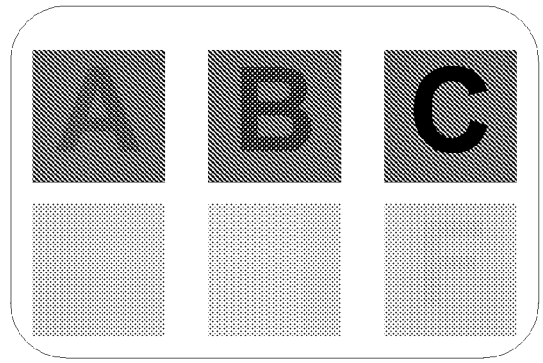
FIG. 12 shows a test card like that of FIG. 11, but printed on a printer having a transfer characteristic like that shown in FIG. 8.

A different test card is shown in FIGS. 11 and 12. The FIG. 11 card was printed on a correctly calibrated printer; the FIG. 12 card was printed on a printer whose transfer function is like that shown in FIG. 8.

In both cards, the background appearing in the top three tiles is printed using an input signal value of 82. The letters A, B and C are printed using input signal values of 80, 78 and 70, respectively. (These particular numbers are somewhat arbitrary, but serve to illustrate some of the operative principles.)

Consider first the tile in the upper left of FIG. 11. Recall that in a correctly calibrated printer, input values of 80-87 all produce the same printed output tone. (Likewise, input values of 72-79 all produce the same, slightly darker, tone, and input values 64-71 all produce the same, still darker, tone.) Thus, the letter A (printed with input value 80) should not visibly contrast with the surrounding background area (input value 82), since both should fall within the same output tone band. But letter B (printed with input value 78) should be visible, as it should fall in a different output tone band than the background (82). Even more apparent should be letter C, since it is printed with value 70 that is in a different, and not even adjoining, output tone band Likewise in the lower tiles of FIG. 11. The background is printed using an input signal value of 242. The letters D, E and F are printed with input signal values of 240, 238 and 230, respectively.

Again, in a properly calibrated printer, the letter D should not be visible. That is, the input signals that form the letter D (value 240) should produce the same output tone as that produced by the input signals corresponding to the surrounding background (value 242). However, the letter E should be visible, as the input signal that produced it (238) should produce a different output tone than the background signal (242). And letter F should be even more visible, since it is printed with a value (230) that yields a tone falling in a different, and not even adjoining, band than the background (242).

Thus, if a test card of the type just detailed is printed on an ideally calibrated printer, then it should have the appearance of FIG. 11, with the letters A and D not visible, and the other letters in each row having progressively more visibility.

FIG. 12 shows the same card printed on a printer having the transfer function detailed in FIG. 8. Recall that in this mis-calibrated printer, input signal values corresponding to shadow tones are printed with too much contrast. That is, the output shadow tone bands do not correspond to 8 input signal values each (as in the ideal case), but instead correspond to only 2 to 4 input signal values. So in this case, instead of the letter A input signal (value 80) falling within the same output tone range as the surrounding background (input signal value 82), it falls within a different output tone range. Accordingly, the A contrasts with the background and becomes visible. As before, letters B and C are visible. (In this case, letters B and C are even more apparent than before, since they fall in tone bands further spaced from the background tone, due to the high contrast of the mis-calibrated printer in these shadow tones.)

The mis-calibration yields a different result in the lower 3 tiles of the FIG. 12 test card. Here, as before, the letter D (input signal value 240) produces an output tone identical to the surrounding background (input signal value 242), and is thus not apparent. However, in this case the letter E is also not apparent. This is because the printer's mis-calibration causes its input signal value (238) to be rendered as the same output tone as the surrounding background area (242)—contrary to the printer's ideal operation. Letter F is visible in FIG. 12, but only barely. While the printer has rendered its input signal value (230) in a different output tone than the surrounding background (242), it is not as visibly distinct as in the FIG. 11 test card, because the letter and the background are rendered in adjoining output tones.

Thus, by examining a test card like that detailed above, certain mis-calibrations of the printer can be inferred. If the letter A is visible, then this generally means that the printer provides too much contrast in the shadows (i.e., the transfer function curve is too steep in this area). Likewise, if the letter E is not visible, then this generally means that the printer provides too little contrast in the highlights (i.e., the transfer function curve is too gradual in this area).

Moreover, although not particularly illustrated, it will be recognized that if the letter B is not visible, then this generally means that the slope of the transfer function is too gradual for input signal values that are intended to produce shadows (i.e., too little contrast in the lower values of input signals). Conversely, if the letter D is visible, then this generally means that the slope of the transfer function is too steep for input signal values that are intended to produce highlights (i.e., too much contrast in the higher values of input signals).

(The reference to "generally" in the foregoing paragraphs is an acknowledgement that the visibility of a letter on the FIG. 12 test card—or lack thereof—may not be due to too much or too little localized slope in the transfer function. Instead, this effect could be present in a printer with a generally linear response characteristic, e.g., if the transition between pure black and next-to-black occurs between input signal values of 6 and 7, instead of between 7 and 8. A single such misplaced transition boundary could cause some apparently atypical behavior through parts of the input signal range that are highly linear. This is another example of uncertainty that can be addressed—if desired—by a more thorough evaluation of the printer performance, e.g., by using test cards that involve many more input signal values than the few shown in FIG. 12.)

Again, it will be recognized that test cards of the sort just-discussed can be assessed by a human operator, and the observed results entered into a user interface (e.g., "Type in the letters that are visible on the card"). The printer CPU can respond to these assessments to adjust the lookup table data as earlier described. Alternatively, the sensing of the characters can be done with one or more electronic sensors (as indicated in FIG. 13), and this data again used to drive corresponding changes in the lookup table values.

Figure 19:
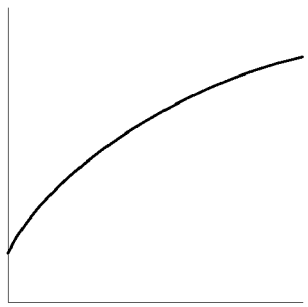
FIG. 19 shows the transfer function of a different printer that can neither print full black nor full white.
Figure 20:
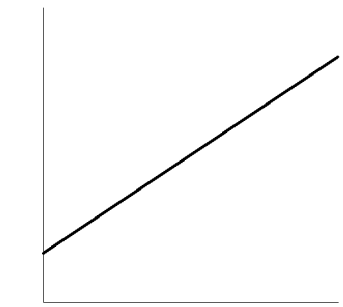
FIG. 20 shows how the transfer function of FIG. 19 may be corrected to yield improved performance.

While the foregoing examples depict a printer whose distorted transfer function encompasses the full range from black to white, the same principles can be applied to any printer. Consider a printer whose actual transfer function is shown by FIG. 19. This printer cannot output a true black (perhaps due to the substrate's resistance to accepting dye) and cannot output a true white (perhaps due to a tinting of the substrate color). Nonetheless, its printing can be improved—especially for watermarking purposes—by linearizing the range of responses that the environmental factors (e.g., substrate characteristics) permit. Thus, the transfer function of FIG. 19 might be corrected to that shown in FIG. 20. Likewise, it is not a requirement that the printer have a relatively simple transfer function of the sort depicted in FIGS. 13, 15 and 16. These were chosen to facilitate explanation. The same principles are applicable to printers having any form of transfer function curve.

Figure 21:
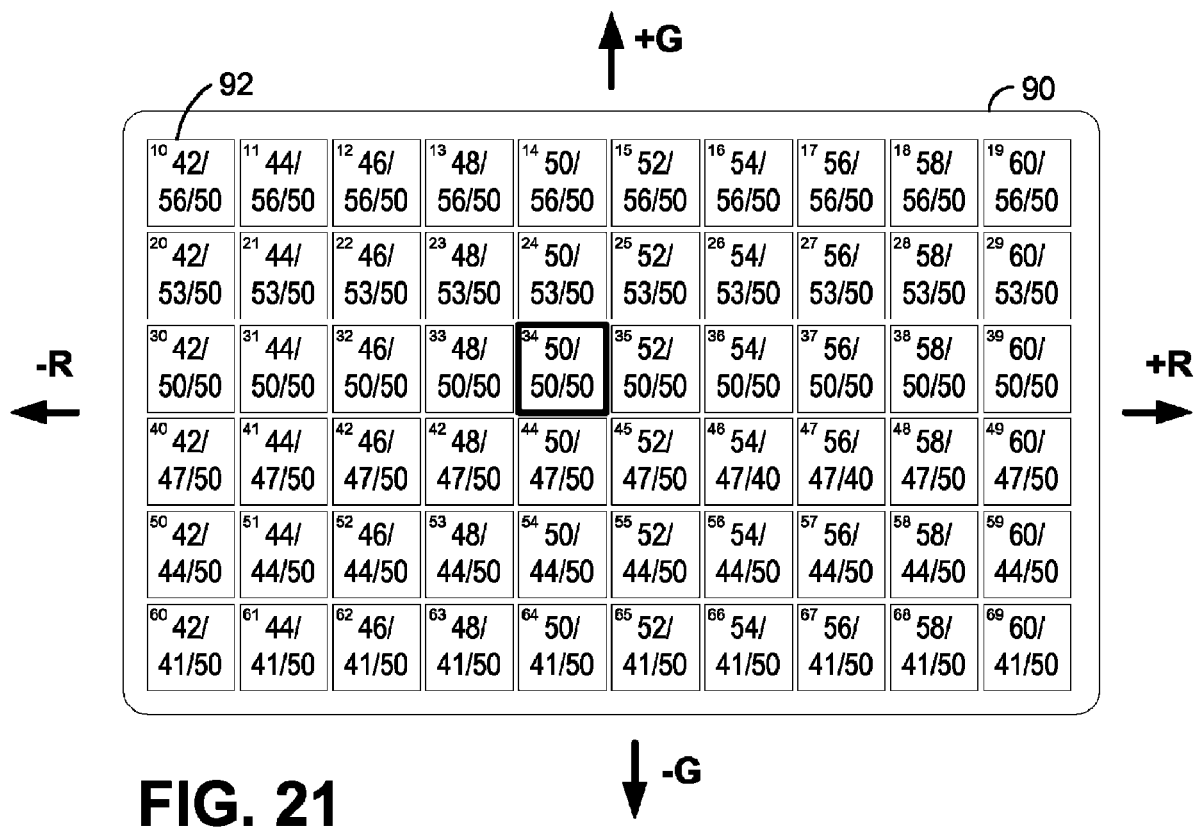
FIGS. 21 and 22 show still other cards according to aspects of the present invention, which can be used for printer calibration.
Figure 22:
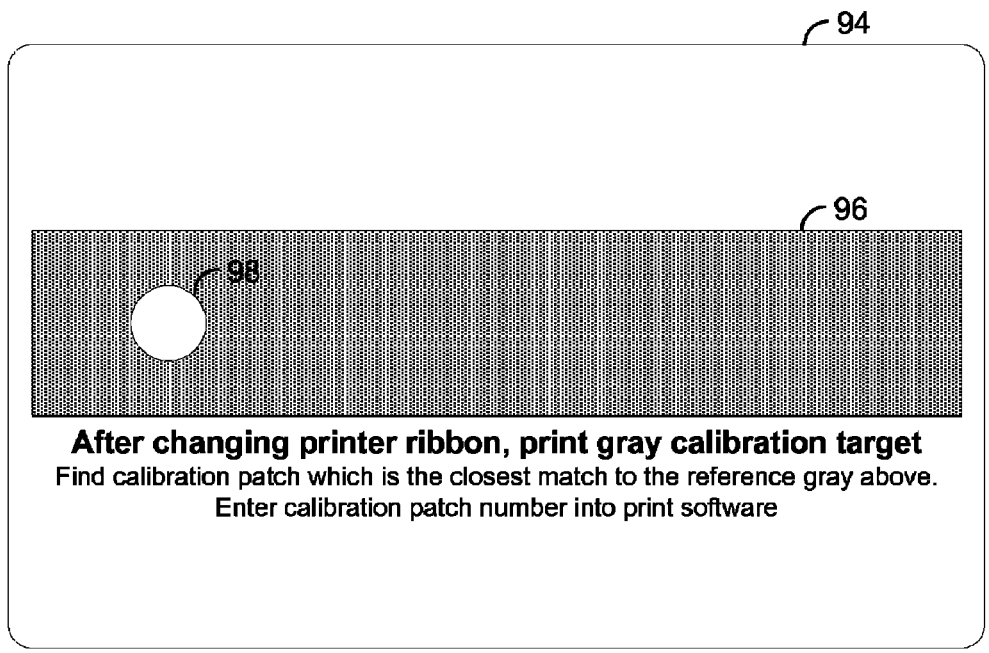

FIGS. 21 and 22 show yet other forms of printer calibration cards. These cards can be used by printer operators to recalibrate printed hues, e.g., whenever printer consumables (e.g., inks, transfer ribbons, or substrates) are changed. (Changing any of these consumables may trigger the printer to present a prompt to the user requesting or requiring recalibration.)

The card 90 of FIG. 21 is comprised of plural rectangular patches 92. Each is printed with a color tone defined by different R-G-B values. The triplet of numbers (e.g., 42/56/50 in the upper left patch) represents the percentage of red, green, and blue. In the printer earlier detailed (with each color ranging in value from 0 to 255), the 42% corresponds to a green value of 0.42*255, or 107; 56% corresponds to a red value of 143, and 50% corresponds to a blue value of 128.

In actual practice, the triplet of values is not printed on the card; they are shown in FIG. 21 for illustrative purposes only. Instead, each patch 92 is of a uniform color (optionally, with an identification indicia printed therein).

The card of FIG. 21 thus presents a spectrum of 60 colors. The patch near the center, with the bold outline, is intended to be printed in mid-gray, i.e., 50% values of red, green and blue. Those to the left of this patch have decreasing amounts of red (2% less in each successive column, in the illustrated card). Those to the right of this patch have similarly increasing amounts of red. Those below this patch have decreasing amounts of green (3% less in each successive row, in the illustrated card). Those above this patch have similarly increasing amounts of green.

It will be recognized that the color blue is said to be constant at 50% in the patches of the FIG. 21 card. Desirably, however, since the values of colors red and green change, the proportion of blue to these colors should also change. That is, in a more preferred arrangement, blue is relatively more dominant in patches to the upper left, and is relatively less dominant in patches to the lower right.

FIG. 22 shows a companion card 94 comprising a reference patch of true gray 96 (i.e., 50/50/50). Typically, this card is provided by the printer vendor and is not printed by the operator at the time of recalibration. Formed through card 94 is a hole 98.

In use, companion card 94 is slid by the operator over test card 90 until the color of the patch 92 showing through the hole 98 most closely matches the reference gray color 96 on the companion card. The reference indicia of the patch 92 containing the best-match color is then typed (or otherwise) entered into a user interface.

Imagine that the operator types "10" into the user interface, signaling to the printer that the patch in the upper left of the card has a color most closely matching the reference gray of the companion card 94. The printer CPU responds by making appropriate changes to lookup table data in the printer (e.g., changes of the sort discussed earlier).

In this case, the R-G-B values associated with patch 92 are 42/56/50. As to the 42% red, the printer actually rendered this patch with about 50% red (since patch 92 is closest to true mid-gray). Accordingly, the printer as originally calibrated was printing red too strongly (i.e., the printer's red transfer function may appear like the curve to the right of FIG. 14). To redress this, a lookup table adjustment is made to reduce the amount of red printed at the middle of the transfer function curve. (As before, the maximum adjustment may be made towards the middle of the curve, with tapering amounts of adjustment made towards either end.)

The green value of patch 92 is 56%. The printer as originally calibrated printed this patch with a green component more like 50% (since this patch was found to be closest to true gray). Accordingly, it appears the printer did not apply as much green to the printed output as the driving signals intended (i.e., the green transfer curve may have a shape like that shown at the right side of FIG. 16). Again, a corresponding change can be made to appropriate lookup table values, e.g., to increase the amount of green applied at middle values, with tapering changes applied at greater and lesser green values.

As noted, all patches in the FIG. 21 card are desirably arranged to have approximately the same luminance, so when red and green are both increased, blue is decreased to keep the luminance constant. Similarly when red and green are both decreased, blue is increased to keep the luminance constant.

More than one card may need to be printed with different levels of luminance, if the change in consumables causes a luminance shift. If a scanner is being used, several different luminance levels (say 4) could be printed on the same card and the luminance and color shift determined together.

The foregoing procedure improves accuracy of printer response in the middle of the color transfer functions. If desired, similar test cards can be made and used to calibrate color contributions in the shadows (e.g., patches centered about 20%, 20%, 20%, compared against a true dark gray patch with these values) and in the highlights (e.g., patches centered about 80%, 80%, 80%, compared against a true light gray patch with these values).

Recall that the printer earlier detailed does not render 256 tones of any color. Instead, only 32 gradations of each color are possible. In printing the test patches on card 21, dithering may be used to obtain intermediate color values. Although the printer may not nominally provide dithering capability, dithering techniques can be employed in establishing the pixel values that make up each of the patches 92.

In an illustrative embodiment, the known Floyd-Steinberg successive error-dispersion dithering technique is used. Thus, if a red value of 242 is desired, and the nearest values the printer can render are 240 and 248, then patch 92 can comprise an array of pixels in which 75% have a red value of 240, and 25% have a red value of 248—interspersed in regular fashion. Thus, the print file provided to the printer comprises just these 240 and 248 values.

The foregoing examples are naturally subject to myriad variations. In the test card of FIG. 21, for example, it will be recognized that the increments by which the colors change in successive rows/columns can be tailored to particular applications; the 2% and 3% numbers are not critical. Nor is it essential that all patches in a row or column share one or more common value.

Although calibration was described with reference to tests based on red, green and blue, tests using other color spaces can of course be used (CMYK being among the alternatives).

The techniques just described can be used in combination, or in hybrid form, with those earlier described—providing increased calibration accuracy.

It should be recognized that the principles discussed above are applicable in contexts other than those particularly detailed. Thus, it is not essential that the invention be employed with dye sublimation printers; any printer can employ these principles. For example, excellent quality photo ID cards can also be produced by using ink jet printing to print on a substrate sheet, e.g., a Teslin® sheet. The ink jet printed substrate is then preferably over laminated with, e.g., polyester laminates and then cut into a typical ID card size (e.g., conforming to an ISO standard). Other printing technologies, including color xerography, offset press, laser engraving, etc., can likewise benefit by application of the present technology.

Moreover, the example of an input signal that ranges in value from 0 to 255 is exemplary only, not limiting. Similarly, there is nothing essential about the print mode being able to produce only 32 distinct output tones. Although the illustrative printer does not employ dithering or other known image enhancement techniques, embodiments of the invention can use such techniques if desired. (In some such embodiments it may be desirable to temporarily disable dithering when printing certain test patterns, so the transfer response transitions can be more readily discerned.)

Of course, it will be recognized that the techniques detailed herein find application in myriad printing applications, not just in the production of digitally watermarked photo ID cards.

Not much has yet been said about the details of digital watermarking. Such technology is well known in the printing art. The assignee's U.S. Pat. No. 6,614,914 is exemplary. Some of my earlier work in this field is detailed in U.S. Pat. No. 6,700,995 ("Applying Digital Watermarks Using Dot Gain Correction") and published application US 2002-0164052 ("Enhancing Embedding of Out-Of-Phase Signals"). Other applications that particularly discuss watermark technology as it relates to identification cards (e.g., drivers' licenses) include 60/495,373, filed Aug. 14, 2003 ("Identification Document and Related Methods," which served as a priority application for published document US 2004-0181671) and US 2003-0183695 ("Multiple Image Security Features for Identification Documents and Methods of Making Same"). The teachings of each of these documents can be employed in embodiments according to the present invention. These patent documents, as well as those earlier cited, are incorporated herein by reference.

Having described and illustrated the principles of my inventive work with reference to illustrative embodiments thereof, it will be recognized that these embodiments are illustrative only and should not be taken as limiting the scope of the invention. Rather, I claim as my invention all such modifications as may fall within the scope and spirit of the following claims, and equivalents thereto.

I claim:

1. A method of calibrating the method comprising:
   instructing a printer to print a test graphic comprised of features, wherein each feature has a different tone value;
   receiving data based on an assessment of the appearance of the test graphic, as actually printed; and
   changing a tonal compensation parameter of the printer based on the received data;
   wherein the received data relates to a width dimension of one or more of the features.

2. The method of claim 1, wherein the received data indicates a number of bands printed in a region of the test graphic.

3. The method of claim 1, wherein the received data indicates whether a first of the features is wider or narrower than a reference width.

4. The method of claim 1, wherein receiving data based on an assessment of the appearance of the test graphic comprises receiving data from a sensor of the printer.

5. The method of claim 1, further comprising printing a digitally watermarked document using the printer after changing of the tonal compensation parameter.

6. The method of claim 1, wherein the received data relates to a width dimension between a first change in contrast and a second change in contrast in the test graphic as actually printed.

7. A method of calibrating, the method comprising:
   printing, with a printer, a test pattern, the test pattern including a first visible feature that spans a plurality of pixels in both width and height;
   assessing a width of the first visible feature; and
   modifying a tonal compensation parameter of the printer based on the assessment.

8. The method of claim 7, wherein the printer comprises at least one of an ink-jet, dye sublimation, xerography, offset press, mass transfer, and laser engraving printing apparatus.

9. The method of claim 7, wherein assessing the width of the first visible feature comprises receiving data from a sensor of the printer.

10. The method of claim 7, further comprising printing a digitally watermarked document using the printer after modifying the tonal compensation parameter.

11. The method of claim 7, wherein assessing the width of the first visible feature comprises determining if the width of the first visible feature is greater than a reference width.

12. The method of claim 11, wherein assessing the width of the first visible feature comprises determining if the width of the first visible feature is greater than a width of a second visible feature.

13. A method of calibrating, the method comprising:
   printing, with a printer, a test pattern;
   receiving data indicating one of two possible and opposite assessments concerning the printed test pattern;
   making a first rote change to a tonal compensation parameter of the printer if the received data indicates a first of the assessments; and
   making a second, different, rote change to the tonal compensation parameter if the received data indicates a second of the assessments.

14. The method of claim 13, wherein the printer comprises at least one of an ink-jet, dye sublimation, xerography, offset press, mass transfer, and laser engraving printing apparatus.

15. The method of claim 13, further comprising receiving the data from a human operator viewing the printed test pattern.

16. The method of claim 13, further comprising printing a digitally watermarked document using the printer after changing the tonal compensation parameter.

17. The method of claim 13, wherein the data comprises information provided by a sensor of the printer.

18. The method of claim 13, wherein the two possible assessments comprise an assessment that a feature printed in the test pattern can, or cannot, be discerned.

19. The method of claim 13, wherein the two possible assessments comprise an assessment that a first feature printed in the test pattern is relatively wider, or relatively narrower, than a reference width.

20. The method of claim 19, wherein the reference width comprises a width of a second feature printed in the test pattern.

21. A method comprising:
   printing, with a printer, a test pattern comprising a plurality of patches, each patch being defined by a unique combination of colorant data signals;
   receiving an indication of which patch appears to most closely match a reference color; and
   modifying a tonal compensation parameter based on the indication;
   wherein certain ones of the plurality of patches are defined by unique combinations of three different colorant signals.

22. The method of claim 21, further comprising placing a medium over the printed test pattern, wherein:
   the medium has the reference color printed up to an edge of the medium;
   the edge of the medium is configured to define a boundary between the reference color and one or more patches of the printed test pattern; and
   the medium is configured to aid in identifying a patch that appears to most closely match the reference color.

23. A method comprising:
   instructing a printer to print a test graphic comprised of elements that should differ slightly in tone value;
   receiving, from a sensor of the printer, data based on a difference between the visual appearance of a first and second of the elements, as actually printed; and
   changing a tonal compensation parameter of the printer based on the received data.

24. The method of claim 23, further comprising printing a digitally watermarked document using the printer after changing the tonal compensation parameter.

25. A method comprising:
   printing, with a printing apparatus, a test pattern comprising a plurality of patches, each patch being defined by a unique combination of colorant data signals;
   receiving an indication of which patch appears to most closely match a reference color; and
   modifying a tonal compensation parameter based on the indication;

wherein the plurality of patches comprises three patches having different values of a first colorant data signal, and three patches having different values of a second colorant data signal.

26. An apparatus for calibration, the apparatus comprising:
a processor configured to:
  instruct a printer to print a test graphic comprised of features, wherein each feature has a different tone value;
  receive data based on an assessment of the appearance of the test graphic, as actually printed; and
  change a tonal compensation parameter of the printer based on the received data;
wherein the received data relates to a width dimension of one or more of the features.

27. A non-transitory computer-readable storage medium having instructions stored thereon that, if executed by a computing device, cause the computing device to perform operations comprising:
  instructing a printer to print a test graphic comprised of features, wherein each feature has a different tone value;
  receiving data based on an assessment of the appearance of the test graphic, as actually printed; and
  changing a tonal compensation parameter of the printer based on the received data;
wherein the received data relates to a width dimension of one or more of the features.

* * * * *

UNITED STATES PATENT AND TRADEMARK OFFICE
CERTIFICATE OF CORRECTION

| | | |
|---|---|---|
| PATENT NO. | : 8,009,324 B2 | |
| APPLICATION NO. | : 12/105647 | |
| DATED | : August 30, 2011 | |
| INVENTOR(S) | : Reed | |

It is certified that error appears in the above-identified patent and that said Letters Patent is hereby corrected as shown below:

Column 15, line 11, in Claim 1, delete "calibrating" and insert -- calibrating, --.

Signed and Sealed this
Seventeenth Day of April, 2012

David J. Kappos
*Director of the United States Patent and Trademark Office*